US006053651A

United States Patent [19]

Tokuwa et al.

[11] Patent Number: 6,053,651

[45] Date of Patent: Apr. 25, 2000

[54] CONNECTOR FOR ATTACHMENT TO A PANEL

[75] Inventors: Koichiro Tokuwa; Mitsuru Ito, both of Yokkaichi, Japan

[73] Assignee: Sumitomo Wiring Systems, Ltd., Japan

[21] Appl. No.: 08/931,872

[22] Filed: Sep. 17, 1997

[30] Foreign Application Priority Data

Sep. 17, 1996 [JP] Japan .................................... 8-244705

[51] Int. Cl.[7] ........................................................ F16B 9/02

[52] U.S. Cl. ................................ 403/12; 403/11; 403/329

[58] Field of Search ..................................... 403/326, 329, 403/327, 328, 11, 12, 109.1, 109.2, 109.3, 109.6; 411/508, 509, 913, 901; 285/423, 210, 140.1; 439/552, 557

[56] References Cited

U.S. PATENT DOCUMENTS

| | | | |
|---|---|---|---|
| 1,085,543 | 1/1914 | Collins | 403/329 X |
| 2,496,700 | 2/1950 | Cole | 403/326 X |
| 3,126,039 | 3/1964 | Fiddler | 411/913 X |
| 3,434,746 | 3/1969 | Watts | 285/140.1 |
| 3,654,382 | 4/1972 | Rubright | 285/140.1 X |
| 3,665,778 | 5/1972 | Bohan et al. | 403/329 X |
| 4,609,119 | 9/1986 | Richter . | |
| 4,629,220 | 12/1986 | Crusco | 285/423 X |
| 5,372,523 | 12/1994 | Sakatani et al. . | |
| 5,632,061 | 5/1997 | Smith et al. | 403/329 X |

FOREIGN PATENT DOCUMENTS

| | | | |
|---|---|---|---|
| 0147828 | 7/1985 | European Pat. Off. . | |
| 0615315 | 9/1994 | European Pat. Off. . | |
| 5335056 | 12/1993 | Japan . | |
| 121639 | 6/1948 | Switzerland | 403/329 |

*Primary Examiner*—Harry C. Kim

*Attorney, Agent, or Firm*—Jordan B. Bierman; Bierman, Muserlian and Lucas

[57] ABSTRACT

A connector, particularly designed for attachment to an automobile door having an opening therein, including a hood passing through the opening when the device is installed. The hood carries, on one surface, a lock piece with an engagement projection and its distal end. Since the entire connector is molded of resin, contact with the perimeter of the opening in the door can scratch the sloped surface of the engagement projection and hinder its insertion. There is provided a metal cover fitting over a sloped surface of the lock piece so that, when the connector is inserted, there is only metal to metal contact between the perimeter of the opening and the cover of the slope surface. In this way, even if there is flash around the perimeter, the connector can be smoothly and readily attached.

12 Claims, 5 Drawing Sheets

CONNECTOR FOR ATTACHMENT TO A PANEL

This Application claims the benefit of the priority of Japanese 8-244705, filed Sep. 17, 1996.

The present Invention is directed to a connector designed for attachment to a panel, particularly a metal panel. More specifically, the present Invention is intended for use in connection with a door panel of an automobile.

BACKGROUND OF THE INVENTION

A prior art device of the general type to which the present Invention is directed is shown in FIGS. 7 and 8. Attachment connector 1 is provided with lower projection 5 and flange 4 adjacent thereto. Lower projection 5 is inserted through opening 9*a* in panel 9. Thereafter, connector 1 is pivoted about a point between flange 4 and lower projection 5 so that lock piece 3 and lock projection 3*a* are forced into opening 9*a*. Since lock piece 3 is flexible, the perimeter of hole 9*a*, bearing against lock projection 3*a*, forces it inwardly so that it can pass through hole 9*a*. Thereafter, its natural resilience allows it to spring outwardly so that the rear perpendicular face of lock projection 3*a* bears against the surface of panel 9, thereby locking connector 1 in place.

However, there is a problem with this device. Specifically, as best shown in FIG. 8, panel 9 will often have flash B adjacent the perimeter of opening 9A. If flash B is located other than at the points in the periphery where lower projection 5 and lock projection 3*a* are introduced, it presents no problem. However, if flash B is located adjacent the point of entry of lock projection 3*a* (as shown in FIG. 8), difficulties in assembly can arise.

It is possible to arrange the stamping of the panel so that any flash formed will project inwardly at a point on the perimeter where lock projection 3*a* and lower projection 5 are not located. However, this would present increased design restrictions on the various dies, molds, etc. used. This, coupled with the rapid turnover of automobile models, militates against following this course. There are simply too many other considerations of greater importance so that this solution is not feasible.

SUMMARY OF THE INVENTION

It is an object of the present Invention to overcome the foregoing problems and to provide a connector which can be easily attached even if flash is present at a critical portion of the perimeter of the panel opening.

The connector of the present Invention, intended for attachment in an opening in the metal panel, is provided with a hood which faces the opening and may be inserted therein. A fitting projection is located on an outer face of the hood with a flange spaced apart therefrom by approximately the thickness of the panel. The fitting projection is inserted into the opening so that a portion of the perimeter is located between the fitting projection and the flange, thereby permitting the fitting projection to bear against the far side of the panel.

Spaced apart from the fitting projection is a lock piece on the exterior of the hood which is intended for insertion into the opening in a manner similar to that of the fitting projection. The lock piece is provided with a sloped surface which slants inwardly in the insertion direction of the connector. A metal cover is fitted onto the sloped surface and preferably locked thereon. The metal cover slides against the perimeter during insertion of the lock piece, whereby the pressure of the perimeter forces the lock piece to flex inwardly, thus permitting the lock projection to pass through the opening and spring outwardly thereafter, thereby locking the connector in place.

Preferably, the lock piece and the lower projection are spaced diametrically opposite each other on the exterior surface of the hood. This provides maximum security for the connector.

In a further refinement of the device, the engagement projection is provided with a front groove, which begins at the leading edge of the engagement projection and extends toward the rear thereof. There is an engagement piece on the cover, complementary to the front groove, which fits into the front groove when the cover is mounted on the sloped surface.

In a preferred form of the connector, the cover also has at least one bent piece which depends from its rear edge, remote from the engagement piece. There is a complementary groove in the rear portion of the engagement projection which receives the bent piece when the cover is mounted. This locks the cover firmly on the sloped surface of the engagement projection. It has been found particularly desirable to provide two bent pieces, spaced apart transversely to the insertion direction of the connector. In this form of the Invention, there are two complementary grooves in the engagement projection.

In some cases, flash is left in the opening projecting inwardly from the perimeter thereof. In such a case, contact between the metal flash and the sloped surface of the engagement projection (which is made of synthetic resin) causes scratching and resistance to entry. Thus, when the metal cover of the present Invention is provided on the sloping surface, it prevents abrasion of the engagement projection and provides a metal to metal sliding contact which reduces the friction substantially as compared to a metal to resin contact. In this way, the attachment of the connector to the panel is more reliable and easier.

BRIEF DESCRIPTION OF THE DRAWINGS

In the accompanying drawings, constituting a part hereof, and in which like reference characters indicate like parts.

DETAILED DESCRIPTION OP THE INVENTION

Figure 1:
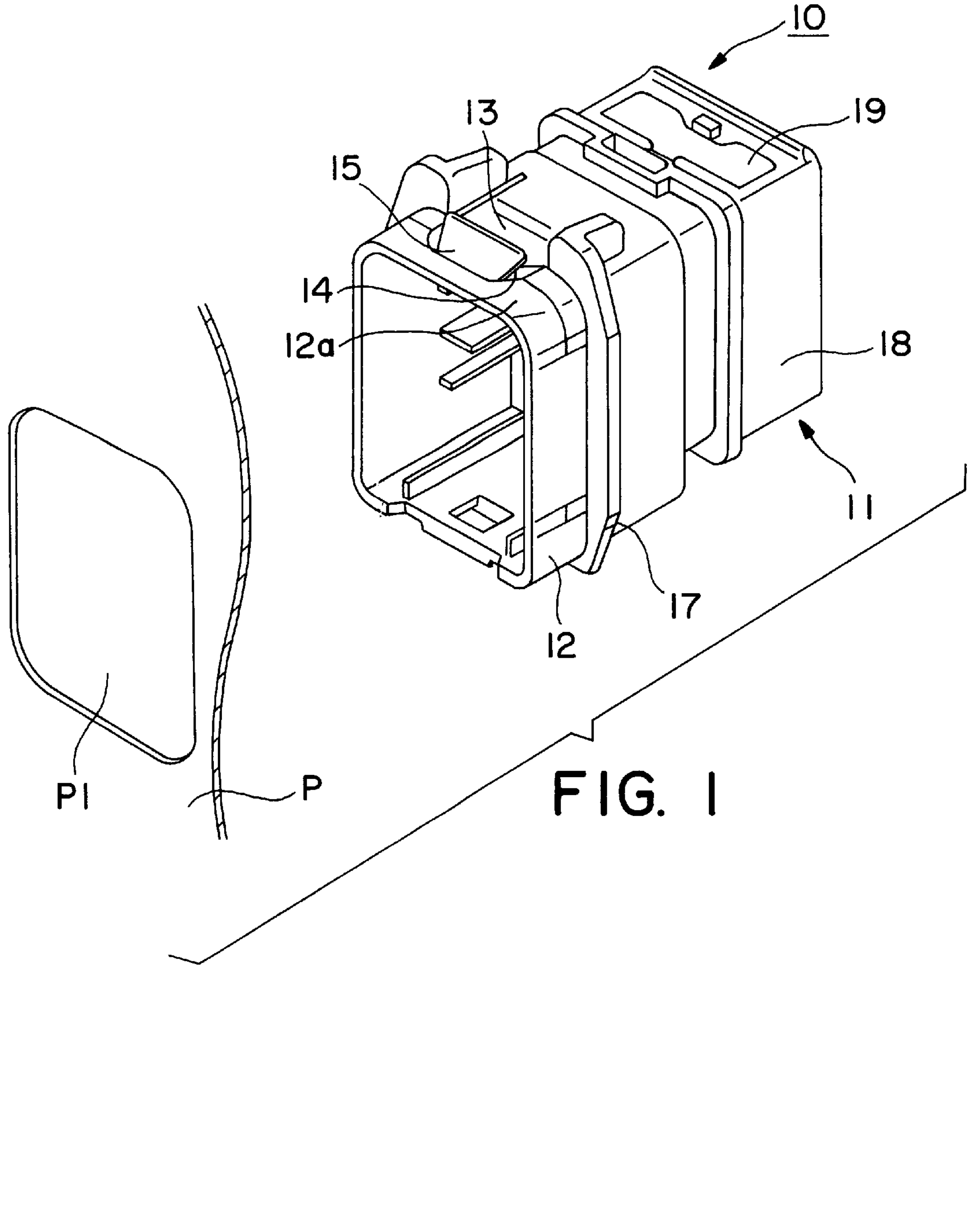
FIG. 1 is a diagrammatic exploded perspective view of the connector of the present Invention.
Figure 2:
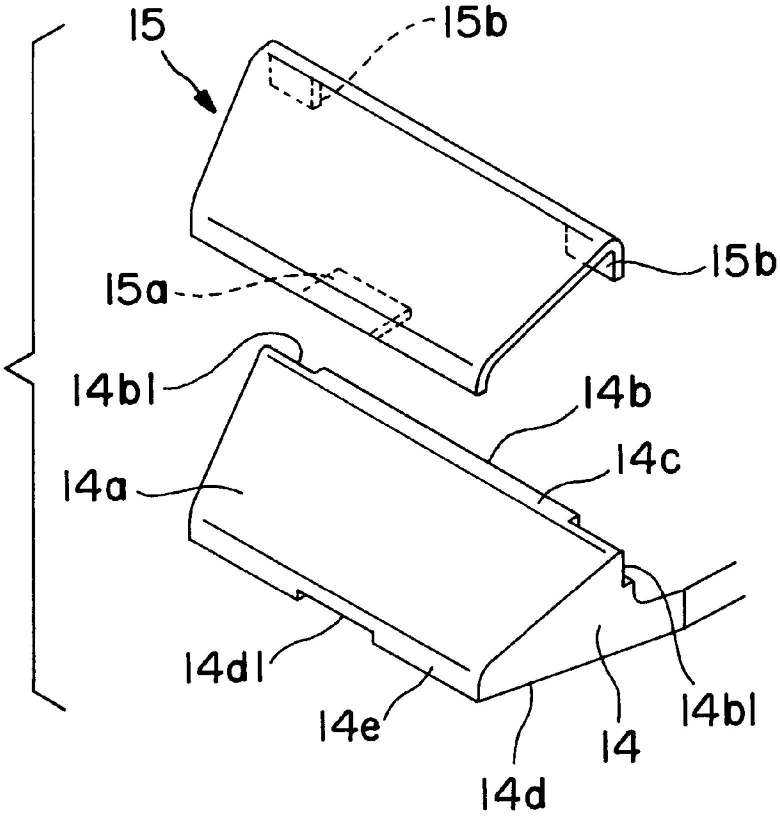
FIG. 2 is a perspective view of the engagement projection and its metal cover, separated from each other.
Figure 3:
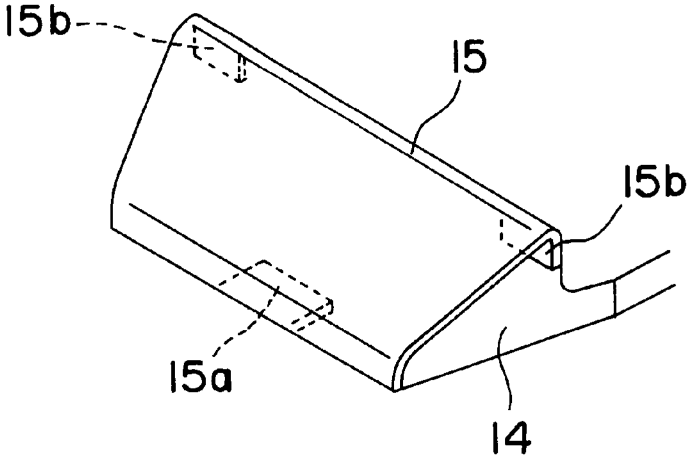
FIG. 3 is a perspective view, similar to that of FIG. 2, showing the cover on the engagement projection.

With reference to FIGS. 1 to 6, connector 10 comprises housing 11 and hood 12. Upper wall 12*a* of hood 12 carries lock piece 13 which terminates in engagement projection 14. Cover 15 fits over sloped surface 14*a*. Engagement projection 14 has perpendicular surface 14*b*, horizontal surface

14*c*, bottom surface 14*d*, and perpendicular end surface 14*e*. In bottom surface 14*d* is front groove 14*d*1. Complementary grooves 14*b*1 are adjacent each lateral end of perpendicular surface 14*b*. Cover 15 is provided with engagement piece 15*a* and bent pieces 15*b*.

Figure 4:
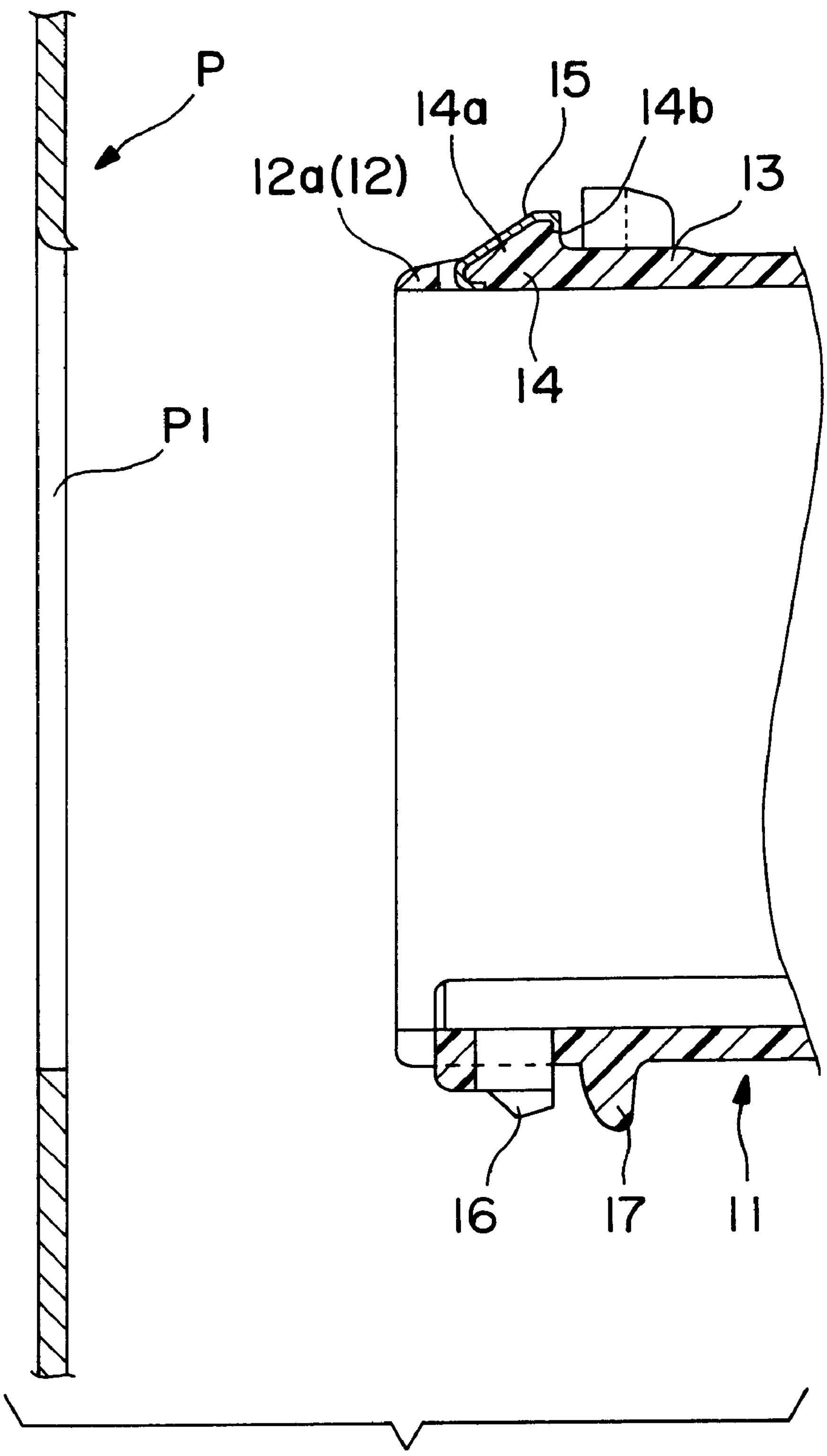
FIG. 4 is a cross-section of the panel and the hood before insertion into the opening.
Figure 5:
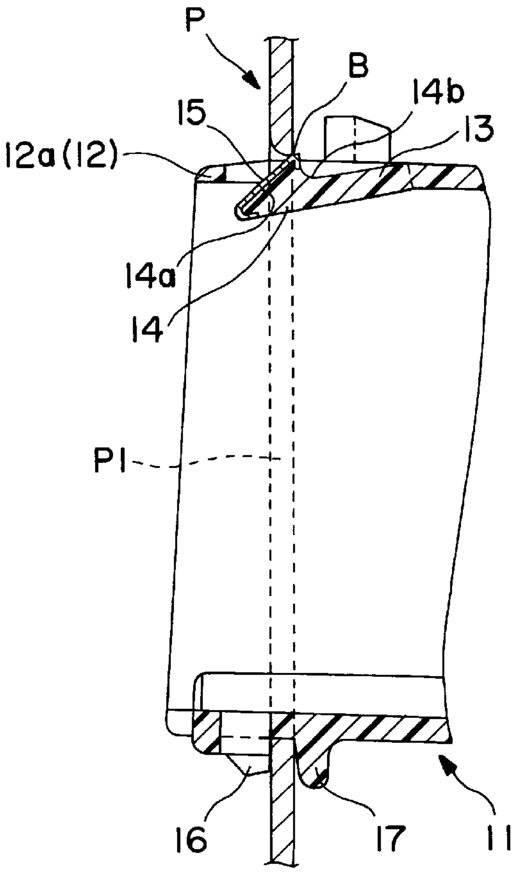
FIG. 5 is a view, similar to that of FIG. 4, wherein the hood is partially inserted into the panel.
Figure 6:
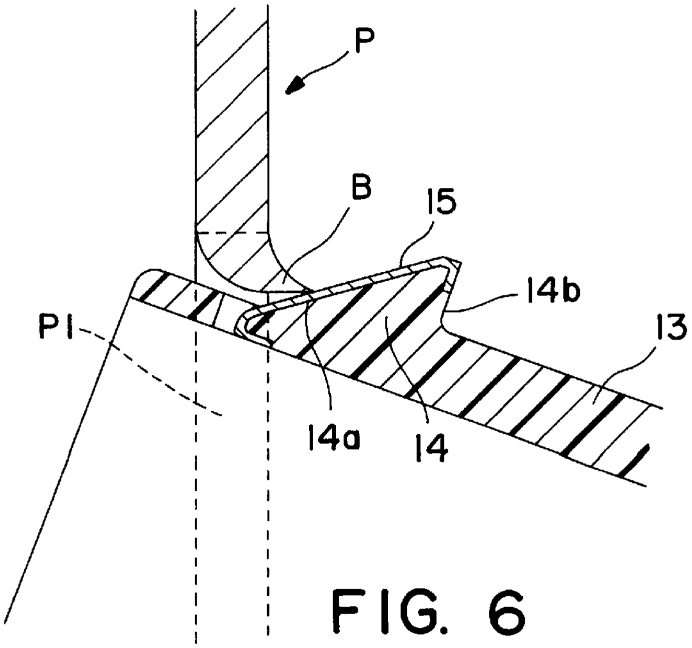
FIG. 6 is an enlarged fragmentary cross-section showing the action of the present Invention when flash is present.
Figure 7:
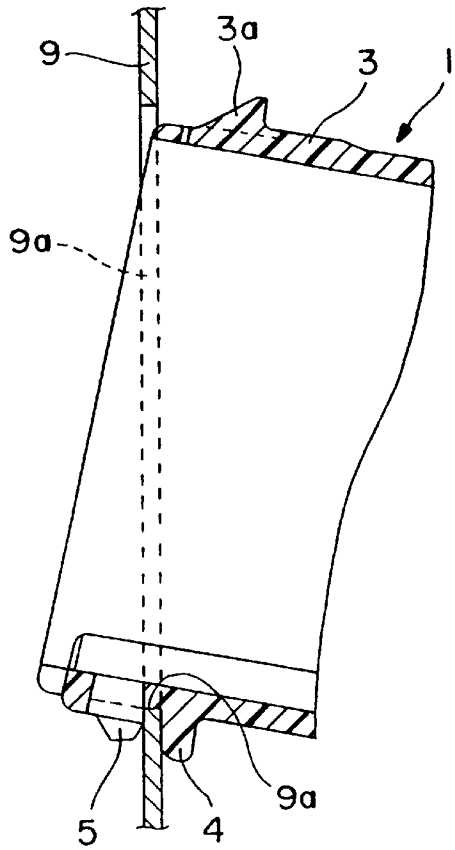
FIG. 7 PRIOR ART
FIG. 7 is a view, similar to that of FIG. 5, of the prior art connector.
Figure 8:
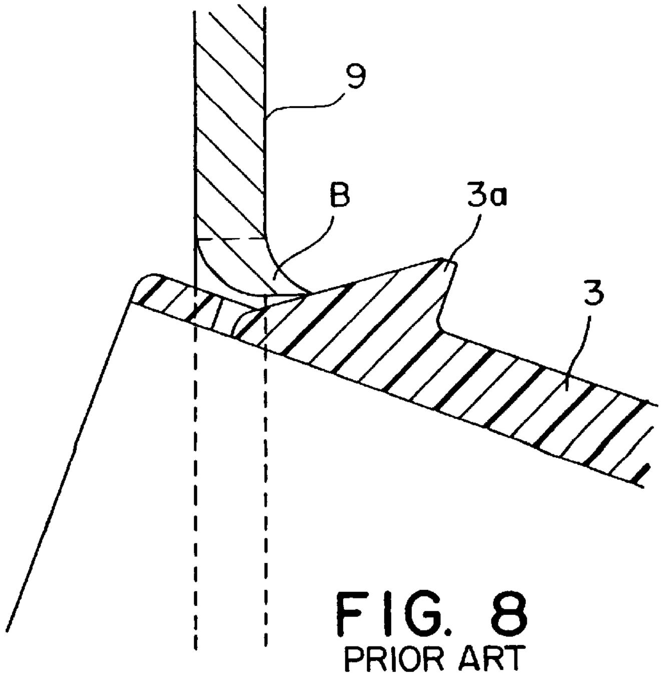
FIG. 8 PRIOR ART
FIG. 8 is a view, similar to that of FIG. 6, of the prior art connector of FIG. 7.

Insertion of connector 10 into opening P1 in panel P is best seen in FIGS. 4 to 6. Fitting projection 16 is first inserted through opening P1 so that the perimeter thereof fits between flange 17 and fitting projection 16. Hood 12 is then rotated about the portion of the perimeter of opening P1 adjacent flange 17 so that the opposite perimeter of opening P1 bears against metal cover 15 on sloped surface 14*a*, thereby causing lock piece 13 to flex inwardly. This is particularly shown in FIGS. 5 and 6. Due to the metal to metal contact between cover 15 and panel P, flashing B does not damage sloped surface 14*a*, nor does it cause any increased friction therebetween. In actuality, the sliding contact between cover 15 and flashing B is low friction and permits easy introduction of engagement projection 14 into opening P1 so that perpendicular surface 14B bears against panel P adjacent the perimeter thereof.

It is, of course, possible to make lock piece 13 (and engagement projection 14) entirely from metal, thus eliminating the need for cover 15. However, connecting this metal part to the remainder of the connector (which is of resin) is extremely difficult. For example, if insert molding is to be used, the entire connector becomes larger and more expensive. In the present Invention, cover 15 is located only on engagement projection 14, and is easily snapped into place. Moreover, cover 15 itself is easily produced by simple bending of a metal plate. This retains the small size of the connector and keeps production costs low.

While only a limited number of specific embodiments of the present Invention have been expressly disclosed, it is, nonetheless, to be broadly construed and not to be limited except by the character of the claims appended hereto.

What we claim is:

1. A connector for attachment in an opening in a panel, said opening having a perimeter, said panel having a near side, facing an insertion direction of said connector, and a far side, opposite said near side, a hood on said connector adapted to face said panel and substantially complementary to said opening, a fitting projection on an outer face of said hood and adapted for insertion into said opening in said insertion direction and adapted to bear against said far side adjacent said perimeter after insertion;

a lock piece on an exterior of said hood spaced apart from said fitting projection, adapted for insertion into said opening from said near side, and adapted to bear against said far side adjacent said perimeter after insertion;

an engagement projection including a sloped surface on said lock piece slanting inwardly in said insertion direction, a metal cover on said sloped surface and adapted to slide against said perimeter during insertion of said lock piece;

said engagement projection having a front groove in a bottom surface thereof, commencing at a leading edge of said engagement projection and extending parallel to said direction away from said leading edge, an engagement piece on said cover, complementary to said front groove, adapted for insertion into said front groove when said cover is on said sloped surface.

2. The connector of claim 1 wherein said lock piece is on an opposite surface of said hood from said fitting projection.

3. The connector of claim 1 wherein said cover has at least one bent piece depending from a rear edge thereof remote from said engagement piece, at least one complementary groove in said engagement projection adapted to receive said bent piece when said cover is on said sloped surface.

4. The connector of claim 3 wherein there are two bent pieces, spaced apart transversely to said insertion direction, and two complementary grooves in said engagement projection.

5. The connector of claim 1 comprising a flange on the outer face of said hood, adjacent said fitting projection and spaced apart therefrom in an upstream direction opposite said insertion direction, by approximately a thickness of said panel.

6. The connector of claim 1 wherein said panel is metal.

7. The connector of claim 1 wherein said lock piece is resilient.

8. A connector in an opening in a panel, said opening having a perimeter, said panel having a near side, facing an insertion direction of said connector, and a far side, opposite said near side, a hood, open in said insertion direction, on said connector in said opening and substantially complementary thereto, a fitting projection on an outer face of said hood inserted into said opening in said insertion direction and bearing against said far side adjacent said perimeter;

a lock piece on an exterior of said hood spaced apart from said fitting projection inserted into said opening from said near side and bearing against said far side adjacent said perimeter;

an engagement projection including a sloped surface on said lock piece slanting inwardly in said insertion direction, a metal cover on said sloped surface, and whereby said metal cover slides against said perimeter during insertion; said cover having at least one bent piece depending from a rear edge thereof remote from said engagement piece, at least one complementary groove in said engagement projection adapted to receive said bent piece when said cover is on said sloped surface.

9. The connector of claim 8 wherein there are two bent pieces, spaced apart transversely to said insertion direction, and two complementary grooves in said engagement projection.

10. The connector of claim 8 comprising a flange on the outer face of said hood, adjacent said fitting projection and spaced apart therefrom in an upstream direction opposite said insertion direction, by approximately a thickness of said panel.

11. The connector of claim 8 wherein said panel is metal.

12. The connector of claim 8 wherein said lock piece is resilient.

* * * * *